United States Patent [15] 3,671,609
Kaufman [45] June 20, 1972

[54] NEW POLYMERIC COMPOSITIONS
[72] Inventor: Martin H. Kaufman, China Lake, Calif.
[73] Assignee: The United States of America as represented by the Secretary of the Navy
[22] Filed: July 27, 1970
[21] Appl. No.: 58,699

[52] U.S. Cl. ............................................260/879, 260/92.1
[51] Int. Cl. ......................C08f 1/68, C08f 3/20, C08f 15/02
[58] Field of Search ...........................................260/92.1, 879

[56] References Cited

UNITED STATES PATENTS 2,750,431  6/1956  Tarrant et al. ..........................260/653
3,035,034  5/1962  McKusick et al. .....................260/92.1
3,252,932  5/1966  Bolstad et al. .........................260/29.4
3,335,122  8/1967  Trepka ...................................260/94.2
3,562,341  2/1971  Tarrant et al. .......................260/653.3

Primary Examiner—Joseph L. Schofer
Assistant Examiner—Richard A. Gaither
Attorney—R. S. Sciascia and Roy Miller

[57] ABSTRACT

Polymeric compositions characterized by being fiber-forming and stereospecific and capable of being melted and drawn into strong crystalline filaments and fibers. The compositions are useful as storage stable binders as well as adhesives for fluorcarbon material.

5 Claims, No Drawings

NEW POLYMERIC COMPOSITIONS

GOVERNMENT INTEREST

The invention described herein may be manufactured and used by or for the Government of the United States of America for governmental purposes without the payment of any royalties thereon or therefor.

BACKGROUND OF THE INVENTION

This invention relates to new polymeric compositions and to the process for the preparation thereof.

At the time there are a number of fluorinated organic polymers on the market. Each possesses useful properties, but each also has certain drawbacks such as difficult and expensive preparation and limited field of application. The present invention provides a di(trifluoromethyl)butadiene which is comparatively inexpensive to prepare and unlike the butadiene polymers presently known can be melted and drawn into strong crystalline filaments and fibers. The compound 4,4-di-(trifluoromethyl)-1,3-butadiene used herein, also called 5,5,5-trifluoro-4-(trifluoromethyl)-1,3 pentadiene is disclosed in the Russian literature (V. F. Plakhova and N. P. Gambaryan, Inv. Akad. Nauk. SSSR, otd., Khim, Nauk, 1962, 681-4; Chemical Abstracts 57, 13596g), and is described as being synthesized by the Wittig reaction of acetonylidenetriphenylphosphorane with hexafluoroacetone followed by reduction and then dehydration. Attempts by the Russians to effect polymerization by heat, radiation and free radical chemical initiators were not successful. However, it has been found by others that when pure monomer is used, di(trifluoromethyl)butadiene polymerizes by such free radical means, but only nonstereospecific polymer is formed.

The present invention is for a method of inducing polymerization of di(trifluoromethyl)butadiene by anionic catalysis whereby a new polymeric material is formed which can be easily molded into discs which are good insulators and cast into films which are resistant to air oxidation and impermeable to water. Additionally, the new polymer is useful as a propellant binder as well as an adhesive for fluorocarbon materials. This new stereospecific polymer opacity at about 110° C. and starts to melt at about 119° C. where fibers can be drawn. A block copolymer was also prepared wherein butadiene was first polymerized anionically and 4,4-di(trifluoromethyl)-1,3-butadiene was added to the active system.

DESCRIPTION OF THE INVENTION

Briefly, in accordance with this invention a fiber forming stereospecific fluorinated polybutadiene was prepared by mixing of solution of 4,4-di(trifluoromethyl)-1,3-butadiene (DTFMB) in tetrahydrofuran with a dilute solution of an anionic catalyst selected from the group consisting of butyl lithium, benzyl potassium, amyl sodium, sodium naphthalene, and the like, at dry ice temperature. The product is characterized by being fiber-forming and stereospecific and capable of being melted and drawn into strong crystalline filaments and fibers. The material can also be cast into films.

The invention and its practice are further illustrated by the following examples.

EXAMPLE I

| Ingredients | Percent by weight |
|---|---|
| 4,4-di(trifluoromethyl)-1,3-butadiene | 10 |
| tetrahydrofuran | 90 |
| butyl lithium in hexane solution | $5 \times 10^{-3}$ mole/liter |

The ingredients were mixed in a flask provided with an inert gas inlet to prevent water and oxygen entrance. The flask was maintained at dry ice temperature and rapid polymerization took place upon the addition of the catalytic solution of butyl lithium. The product poly 4,4-di(trifluoromethyl)-1,3-butadiene can be stretched to great length and drawn into strong crystalline filaments and fibers from the melt. It starts to melt at about 119° C.

EXAMPLE II

| Ingredients | Percent by weight |
|---|---|
| 4,4-di(trifluoromethyl)-1,3-butadiene | 10 |
| tetrahydrofuran | 90 |
| benzyl potassium (catalyst) | Under 0.1% |

The ingredients were mixed together at about −70° C. and crystalline poly 4,4-di(trifluoromethyl)-1,3-butadiene was produced.

EXAMPLE III

Six milliliters of pure butadiene was distilled into a reaction flask containing 50 ml of tetrahydrofuran at −78°. Butyllithium was added with swirling, and the resulting clear, bright yellow solution was warmed to −10° for 2 hours. A viscous yellow solution formed which was cooled to −78° and 4 ml of 4,4-di(trifluoromethyl)-1,3-butadiene was added with swirling. For an instant the yellow color become more intense followed rapidly by a complete disappearance of color. The viscosity increased rapidly and after 1 hour a precipitate settled out of solution. An infrared examination of the precipitate indicated that it contained both butadiene and 4,4-di(trifluoromethyl)-1,3-butadiene. Block copolymers are prepared as herein described by adding the 4,4-di(trifluoromethyl)-1,3-butadiene to the active system. The block copolymer contains polybutadiene on one end and poly 4,4-di(trifluoromethyl)-1,3-butadiene on the other. Reverse addition produces only poly 4,4-di(trifluoromethyl)-1,3-butadiene. This copolymer is useful as a storage stable binder.

EXAMPLE IV

To a flask containing about $2 \times 10^{-3}$ mole of butyllithium liter of reaction mixture containing 50 ml dioxane at dry ice temperature, 4,4-di(trifluoromethyl)-3-butadiene was added with stirring so that its concentration was about 1 mole/liter. Over a 24-hour period the viscosity progressively increased until a gel formed. Mixing the gel with methanol produced stereospecific poly 4,4-di(trifluoromethyl)-3-butadiene in a 75 percent yield.

Poly 4,4-di(trifluoromethyl)-1,3-butadiene is formed regardless of the anionic catalyst used. For example, amyl sodium and sodium naphthalene were also used as catalysts and the polymerization product was the same. The polymerization proceeds in ethers, e.g., tetrahydrofuran and dioxane, and in hydrocarbon solvents such as toluene or cyclohexane; however, when hydrocarbon solvents are used the molecular weight of the poly 4,4-di(trifluoromethyl)-1,3 butadiene produced is low due to the insolubility of the growing polymer chain in such solvents.

The rate of polymerization increases as catalyst concentration is increased; also, the molecular weight decreases. No high polymer is formed if the polymerization temperature is high, e.g., 25° C. The catalyst concentrations used were over the approximate range of 2 to $5 \times 10^{-3}$ moles/liter.

One might suppose that the di(trifluoromethyl)butadiene would be attacked by strong alkali. The lithium of butyllithium, for example, would be expected to extract a fluorine atom from the di(trifluoromethyl)butadiene resulting in stable lithium fluoride and low molecular weight organic species. However, at low temperatures in ether solvents the unexpected happens. Initiation and propagation occurs rather than rapid destruction of the polymer catalyst species.

What is claimed is:

1. A process for preparing poly 4,4-di(trifluoromethyl)-1,3-butadiene which comprises reacting a solution of 4,4-di(trifluoromethyl)-1,3-butadiene in the presence of a catalyst comprising in alkali hydrocarbon compound at dry ice temperature; said solution comprising about 10 percent by weight 4,4-di(trifluoromethyl)-1,3-butadiene and about 90 percent by weight of a solvent therefor selected from the group consisting of tetrahydrofuran, dioxane, toluene and cyclohexane; and said catalyst being present in an amount ranging from 2 to $5 \times 10^{-3}$ moles/liter.

2. The product of in the process of claim 1 consisting of poly 4,4-di(trifluoromethyl)-1,3-butadiene characterized by being fiber-forming at 119° C.

3. The process according to claim 1 wherein the catalyst is a member selected from the group consisting of butyllithium, benzyl potassium, amyl sodium, and sodium naphthalene.

4. A process for the copolymerization of 4,4-di(trifluoromethyl)-1,3-butadiene and pure butadiene which comprises first, reacting pure butadiene with an alkali hydrocarbon selected from the group consisting of butyllithium, benzyl potassium, amyl sodium and sodium naphthalene thereby forming a butadiene polymer;

then, reacting said polymer with 4,4-di(trifluoromethyl)-1,3-butadiene;

said reactions taking place at −78° C.

5. The product of claim 4 characterized by having polybutadiene on one end of the polymer chain and poly 4,4-di(trifluoromethyl)-1,3-butadiene on the other.

* * * * *